March 24, 1936. C. J. SCHROEDER 2,035,283
MACHINE TOOL
Filed March 31, 1934 4 Sheets-Sheet 1

Inventor:
Clement J. Schroeder
By Axel E. Hofgren
his Atty.

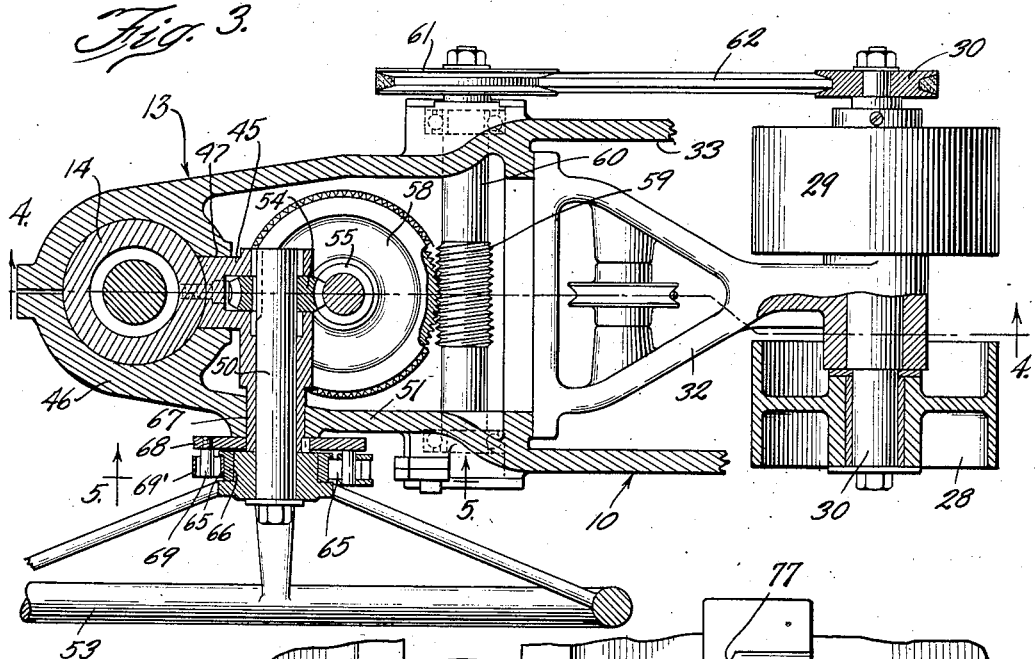

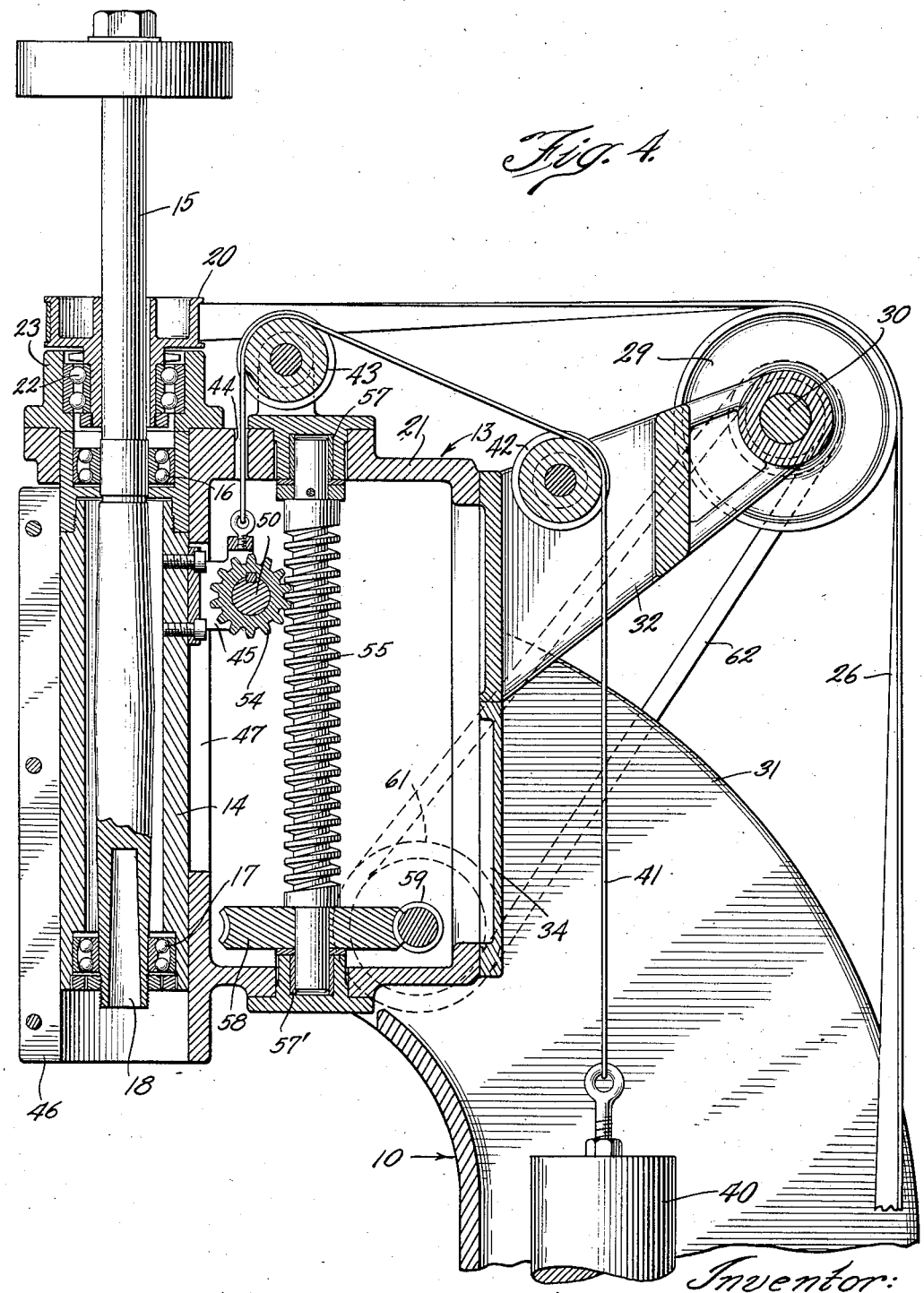

March 24, 1936.   C. J. SCHROEDER   2,035,283
MACHINE TOOL
Filed March 31, 1934   4 Sheets-Sheet 4
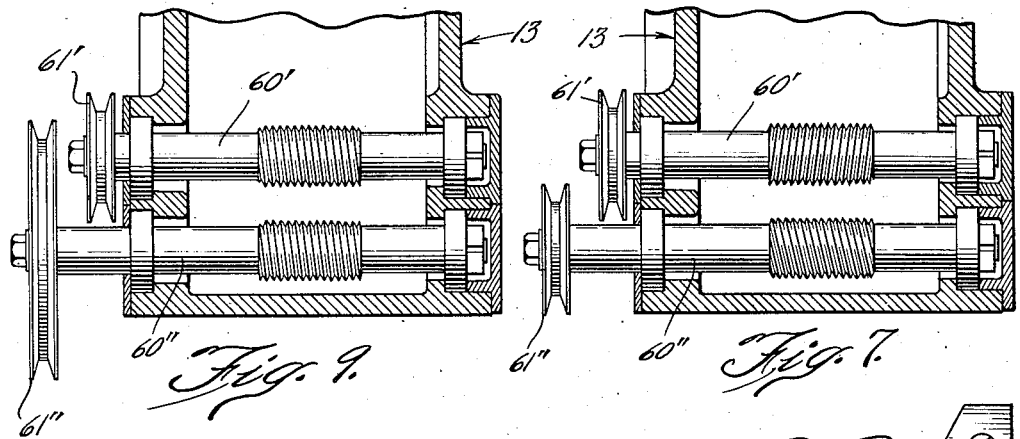
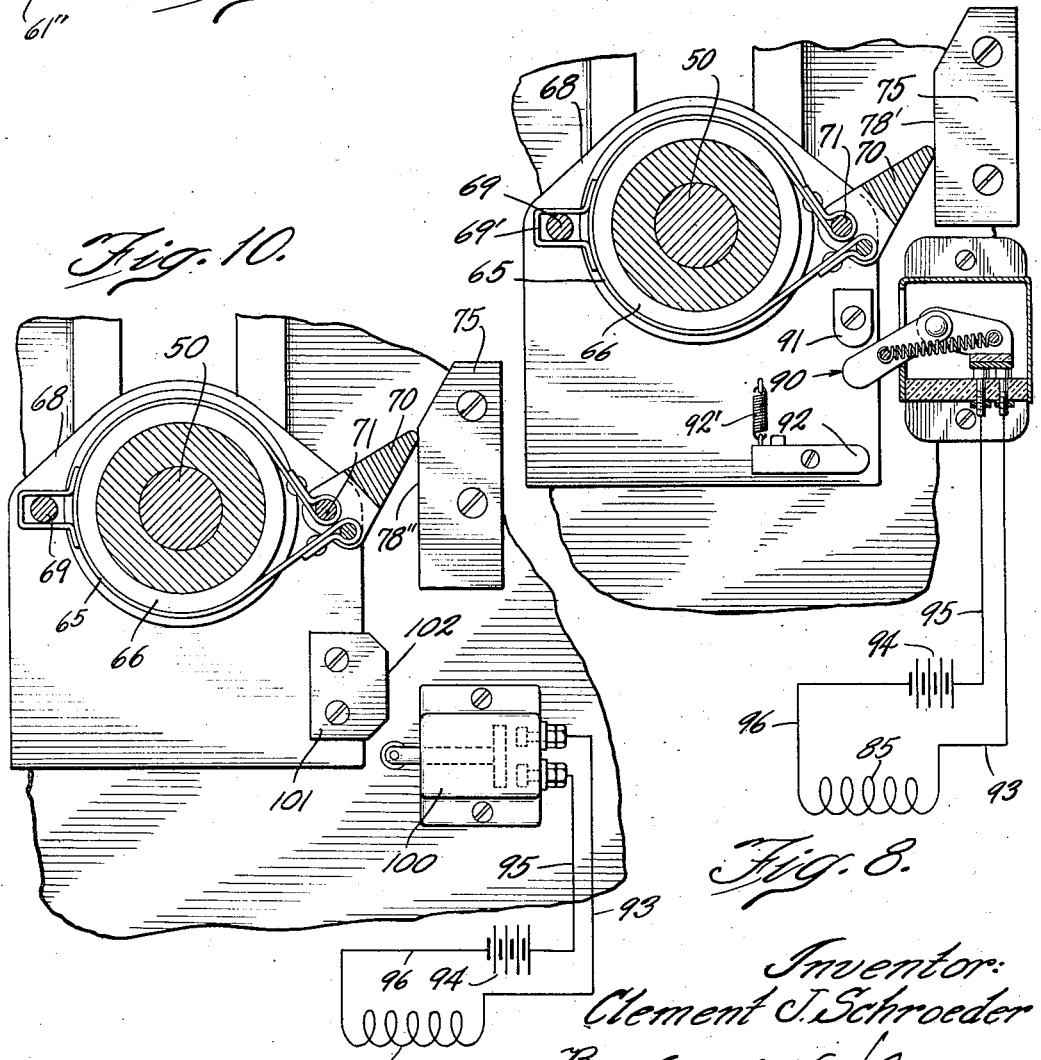
Inventor:
Clement J. Schroeder Patented Mar. 24, 1936

2,035,283

UNITED STATES PATENT OFFICE 2,035,283

MACHINE TOOL

Clement J. Schroeder, Rockford, Ill., assignor to Sundstrand Machine Tool Co., Rockford, Ill., a corporation of Illinois Application March 31, 1934, Serial No. 718,316

17 Claims. (Cl. 77—32)

The invention relates generally to machine tools but more particularly to a boring machine of the vertical type.

An important object of the present invention is to provide a new and improved boring machine which is of the vertical type so as to facilitate and simplify the mounting of work pieces thereon, which is of simple and compact construction, whereby to require the minimum of floor space and adapt the machine for group mounting, and which may be manufactured at a low cost.

Another object is to provide a machine having new and improved tool actuating and feeding mechanism which is simple in character as to both construction and operation, and which permits manual rapid approach movement coupled with automatic termination of the manual approach and initiation of the feeding movement, and automatic initiation of the rapid return movement.

Another object is to provide a machine embodying a simplified feed-traverse mechanism for the tool, which mechanism is such as to be readily adaptable with but few mechanical changes to obtain automatic feeding movement in either direction, or a skip feed cycle of tool advancing movements.

Other objects and advantages will become apparent from the following description, taken in connection with the accompanying drawings, in which:

Fig. 3 is a plan section of the machine taken along the line 3—3 of Fig. 2.

Fig. 4 is a vertical sectional view taken substantially along the line 4—4 of Fig. 3.

Fig. 5 is an enlarged fragmental sectional view taken substantially along the line 5—5 of Fig. 3.

Fig. 6 is a fragmental view similar to Fig. 4 which illustrates an alternative construction.

Fig. 7 is a view taken along the line 7—7 of Fig. 6.

Fig. 8 is a view similar to Fig. 5, and showing the control mechanism employed to attain feeding movement of the tool in both directions.

Fig. 9 is a view similar to Fig. 7 showing an alternative drive mechanism provided in order to attain a skip feed cycle of tool advancing movements.

Fig. 10 is a view similar to Fig. 8 and showing the control mechanism employed in attaining the skip feed cycle.

Figures 1, 2:
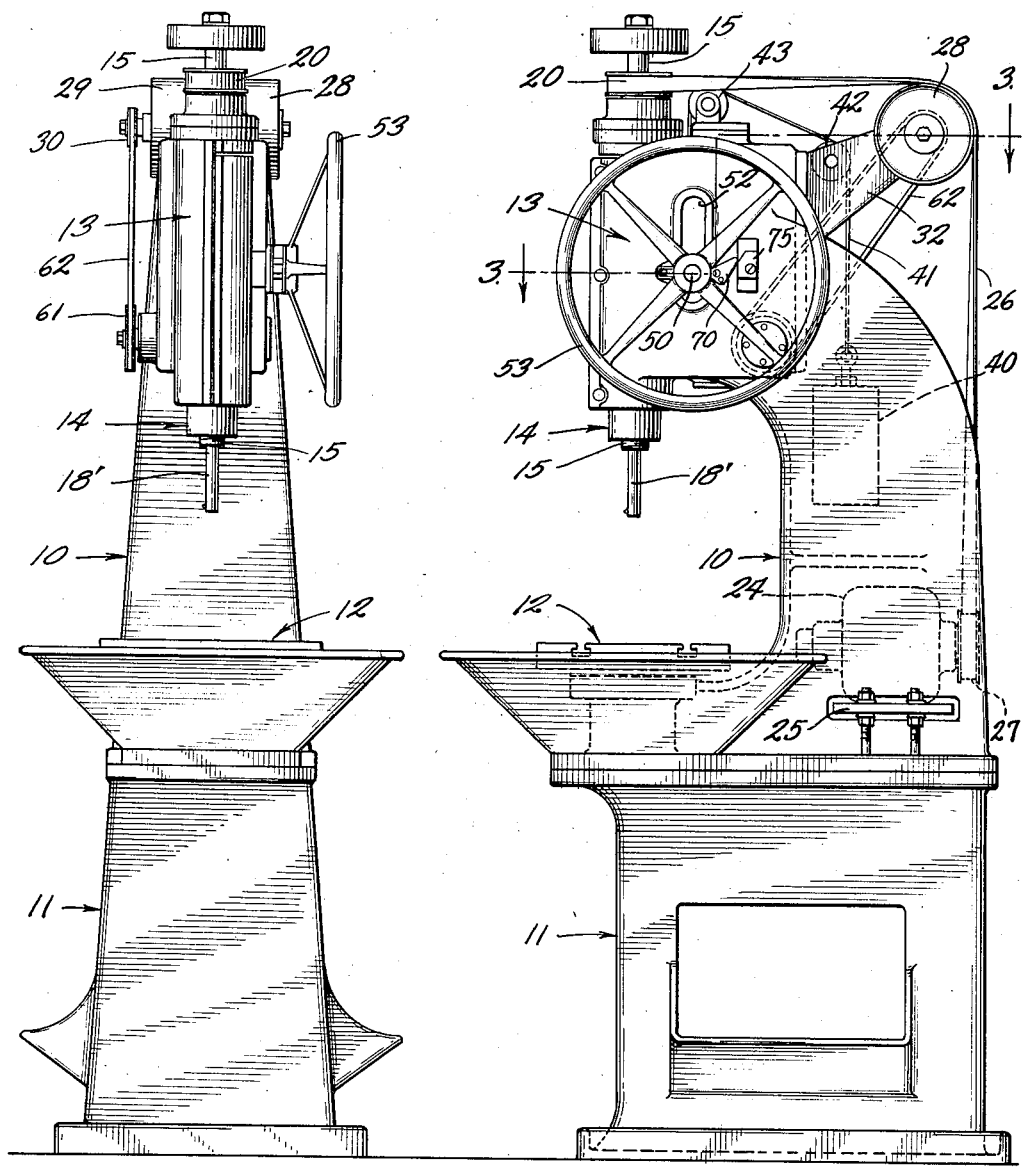
Fig. 1 is a front elevational view of a vertical drilling machine embodying the features of the invention.
Fig. 2 is a side view of the machine.

For purposes of disclosure the preferred form of the invention, together with two alternative embodiments thereof, are illustrated in the drawings and will hereinafter be described in detail as applied to a particular form of boring machine, but it is to be understood that this disclosure is not intended as a limitation of the invention to this type of machine tool, it being contemplated that various changes might be made by those skilled in the art to adapt the invention to other types of tools without departing from the spirit and scope of the invention as defined by the appended claims.

In the form illustrated herein the invention is embodied in a vertical boring machine having a relatively narrow hollow column 10 mounted on the rear portion of a hollow supporting base 11, the column having at its lower end a waist-high work supporting table 12 overlying the forward part of the base 11, and at its upper end, a forwardly projecting stationary gear housing or head 13 in which a vertically positioned quill 14 is mounted for reciprocatory movement toward and away from the table 12.

In the quill 14, as shown in Fig. 4, a tool spindle 15 is rotatably mounted as by means of ball bearings 16 and 17 of the combined radial and thrust type at the upper and lower ends of the quill, so that the spindle 15 moves longitudinally with the quill. At its lower end the spindle 15 is provided with a tool socket 18 to receive a tool such as a diamond boring tool 18', while the upper end of the spindle projects through and has a splined connection with a pulley 20 which is rotatably mounted in fixed axial position on the upper wall 21 of the head 13 by means of a ball bearing 22 and a mounting collar 23.

The drive for the spindle 15 preferably comprises a motor 24, positioned within the lower portion of the column 10 on a vertically adjustable mounting member 25, and having an endless belt 26 extending about a motor pulley 27, the spindle pulley 20, and over a pair of spaced guide pulleys 28 and 29 carried by a horizontal shaft 30 positioned above the curved upper rear portion 31 of the column 10. As shown in Figs. 2, 3 and 4, the shaft 30 is rotatably supported in a bracket 32 secured to the back of the head 13, and the bracket projects upwardly and rearwardly over an opening 33 in the column portion 31. The opening 33 is formed by leaving the back and top of the column open as shown in Fig. 3, and it provides for access to a removable back plate 34 of the head 13, as well as for passage of the belt 26 from the motor pulley to the idler pulleys.

In the embodiment illustrated in Figs. 1 to 5 of the drawings, means is provided for manually advancing the tool spindle 15 at a rapid traverse speed downwardly toward the table, together with means for automatically terminating such rapid manual movement and imparting a slow speed feed actuation throughout the work performing operation, after which the spindle is returned at a rapid traverse speed to its upper or retracted position.

As shown in Fig. 4, the rapid return movement of the spindle is obtained by means of a counterweight 40 positioned within the column 10 and connected by a flexible cord 41 to the quill 14 so as to act normally to draw the quill upwardly in the head. In the present instance the cord 41 extends upwardly from the weight 40 through the opening 33, over a pulley 42 carried by the bracket 32, over a pulley 43 mounted on the top of the head, and downwardly through an opening 44 in the head for connection with a bracket 45 fixed to the quill 14 within the head. The head 13 preferably has a split bearing sleeve 46 (Figs. 3 and 4) for the quill, and the bracket 45 extends rearwardly from the quill through a vertical slot 47 formed in the sleeve. The engagement of the bracket 45 with the sides of the slot 47 serves to prevent rotation of the quill in its bearing sleeve, while its engagement with the upper and lower ends of the slot may act to limit the vertical movements of the quill.

To secure rapid manual approaching movement and slow speed feeding movement of the quill 14, means is preferably provided which is simple in character, and which is adapted for instantaneous shift or change from one speed to the other without delays such as those incident to the employment of conventional shiftable clutches. Thus, as illustrated in Figs. 3 and 4, a horizontal shaft 50, rotatably mounted in the bracket 45, extends transversely through one side wall 51 of the head 13, a slot 52 (Fig. 2) being provided in the wall 51 to permit vertical movement of the shaft 50 with the quill 14 and the bracket 45. On its projecting end, and at one side of the machine, the shaft 50 carries a hand wheel 53 whereby a gear 54 fixed on the shaft within the head may be rotated to roll the same up or down along a rack formed by a screw shaft 55 which is vertically mounted within the head. The gear 54, since it must mesh with the threads of the screw 55, is in the form of a worm gear, and when held against rotation, it acts as a nut and may cause vertical movement of the quill 14 when the screw shaft 55 is rotated.

For the purpose of utilizing this function of the worm gear and screw, the screw 55 is rotatably mounted in bearings 57 and 57' in the top and bottom walls of the head 13. The screw 55 is, in practice, constantly rotated in a direction to cause downward feeding movement of the quill 14 when the gear 54 is held against rotation, a worm wheel 58 keyed to the lower end of the screw 55 meshing with a worm 59 formed on a shaft 60 journaled transversely in the head adjacent to its lower wall. On one end of the shaft 60, which projects through a side wall of the head, a pulley 61 is fixed so as to be driven constantly by means of a belt 62 extending from a pulley 63 fixed on the idler shaft 30. The shaft 30 is, in turn, driven by fixing one of the idler pulleys thereto, in this instance the pulley 29.

Thus it will be evident that by merely starting or stopping the rotation of the hand wheel 53, a change from automatic feed to manual, or vice versa, may be effected. Since the feed screw 55 rotates continuously it is not necessary to start and stop or change the speed of the screw by means of clutches to obtain a change from rapid approach to feed. The manual movement of the wheel 53 causes an additional movement of the head over that caused by the screw 55 when the wheel 53 is held against rotation. Preferably means is provided for stopping the manual actuation of the hand wheel 53 automatically as the tool 18' approaches the work so as to cause the speed of the advancing movement to be reduced automatically before the tool engages the work. To this end a brake is provided for the wheel 53, which brake is preferably of the friction type as shown in Figs. 2, 3 and 5, with a non-rotatable friction band 65 engageable with an annular braking surface 66 on the hub of the hand wheel 53.

To provide a mounting for the brake band 65, a bearing sleeve 67, forming a part of the bracket 45, projects through the slot 52 about the shaft 50 (Fig. 3) and has a mounting plate 68 keyed on its outer end. At one side of the shaft 50 the plate 68 carries a stud 69 to which a bracket 69', fixed on an intermediate portion of the band 65 is anchored, while on the other side of the shaft 50 a brake actuating lever 70 has one of its ends pivoted at 71 on the plate on an axis parallel to the shaft 50. One end of the band 65 is anchored on the pivot 71, while the other end of the band is secured to a pin 71' on the lever between the pivot 71 and the other end of the lever 70, so that in upward pivotal movement of the lever, to the position shown in Figs. 5, 7 and 10, the brake is applied to stop rotation of the hand wheel. The normal released position of the brake lever 70 is shown in dotted outline in Fig. 5, and it is, in the present case, urged to this position by the resiliency of the band 65.

As the manual advancing movement of the tool progresses, the application of the brake takes place automatically by virtue of a cam or dog member 75 adjustably mounted on a boss 76 on the side wall 51 of the head 13. The cam member 75 may have a bevelled corner 77 which is first engaged by the advancing lever to pivot the lever upwardly as the advancing movement of the quill progresses. After the brake has been applied, the end of the lever 70 rides along a dwell surface 78 of the cam member 75 parallel to the path of movement of the quill, and for a distance equal to the length of the surface 78, the feeding action of the rotating screw 55 is effective. When the lever 70 rides off of the lower edge of the dwell surface 78, the brake is released and the shaft 50 and the gear 54 are released so that the quill may be retracted at rapid traverse speed by the counter-weight 40. In the return movement of the quill and the associated brake mechanism, the brake lever 70 is deflected by the cam member 75 downwardly from its normal horizontal position.

In Fig. 6 of the drawings an alternative construction is illustrated which permits other cycles of operation to be attained with but few changes in the mechanical structure of the machine. Thus a pair of worm gears 58' and 58" are rotatably mounted in spaced axial positions on the lower end of the screw 55, with a shiftable clutch member 80 splined to the screw 55 therebetween. To engage the member 80 with the gears 58' and 58" clutches 81 and 82 are formed at the lower and upper ends of the member 80 to engage complemental teeth on the gears 58' and 58" respectively. A bell crank 83 mounted on a rock shaft 84 has one arm 83' engaged with the clutch member 80 for shifting the same, while its other arm 83" extends upwardly and is pivotally connected to an armature 85' of a solenoid actuator 85. A spring 86 carried by an adjustably mounted rod 87 acts against the arm 83" of the bell crank to maintain the clutch 81 normally in its engaged relation, and by energizing the solenoid 85, the clutch member 80 may be shifted to engage the clutch 82.

To drive the worm gears 58' and 58", parallel shafts 60' and 60" are journaled in the head 13 with worms 59' and 59" formed thereon engaging the worm gears. On their projecting ends the shafts 60' and 60" have pulleys 61' and 61" driven from the shaft 30 by belts (not shown) a second pulley being provided on the shaft 30.

With the construction described, the worms and worm gears may be formed with opposite leads as shown in Fig. 7, so as to rotate the worm gears 58' and 58" in opposite directions at the same speed, whereby feeding movement may be obtained in both directions by selective engagement of the clutches 81 and 82. This arrangement permits finishing of the bore in the work during the return stroke of the tool. To attain this result, the brake control cam 75 is formed with a relatively long dwell surface 78', as shown in Fig. 8, which exceeds the length of the feeding stroke and therefore maintains the brake in its effective position at the end of the advancing movement of the tool.

In order to shift the clutch member 80 and thereby terminate the advancing feed of the tool and cause reverse feed thereof, a toggle type switch 90 (Fig. 7) is mounted on the head 13 for actuation at the upper and lower limits of travel of the quill 14 by spaced dogs 91 and 92 fixed on the mounting plate 78. One contact of the switch is connected to the solenoid coil by a lead 93, while a power source 94 is interposed between leads 95 and 96 which are connected to the other contact of the switch and to the other end of the solenoid coil respectively. The switch 90 is open during downward movement of the tool, and is shifted to its closed position by the dog 91 at the end of the down feeding stroke. The solenoid is thereby energized and the clutch member 80 shifted so as to cause return or upward feeding of the tool. The extent of the upward feeding movement is determined by the extent of the dwell surface 78', and as the lever 70 rides off of the upper end of said surface, the brake is released so as to cause the retraction of the tool to be completed at rapid traverse speed by the counter-weight 40. The dog 92 is pivotally mounted and has a positioning spring 92' so that it acts only in upward support movement.

At or near the upper limit of the quill movement, the switch 90 is opened by the dog 92, thereby deenergizing solenoid 85 and permitting a shift of the member 80 to reengage clutch 81 to condition the mechanism for advancing feed actuation during the succeeding operation.

To obtain a skip feed cycle of advancing movement, the worm wheels 58' and 58" are driven in the same direction by worms of the same lead (Fig. 9), but at different speeds by providing a pulley 61" of a relatively large size on the worm shaft 60". Thus the lower gear 58" constitutes a feed driving element, and the upper gear 58' constitutes a traverse driving member. The clutch 81 is normally engaged to cause rotation of the screw 55 at feed speed, and when the solenoid 85 is energized to shift the clutch, the screw speed is increased to cause advancing movement of the tool at rapid traverse speed. With this construction, a normally open push button switch 100, interposed between the leads 93 and 95 of the control circuit is actuated by a dog 101 (Fig. 10) to close the circuit to the solenoid when rapid traverse movement is desired between two feeding movements of the tool. The length of the dwell surface 102 of the dog 101 determines the extent of such rapid traverse movement, and when the dog 101 passes the switch 100 and permits opening thereof, the solenoids is de-energized and the clutch member 80 is shifted to re-establish the feed drive. During both feed portions, as well as the rapid traverse portion of the tool advancing movement, the brake lever 70 rides on the relatively long dwell surface 78" of the cam member 75 (Fig. 10) so as to maintain the brake in its effective position. At the end of the second feed stroke, the lever rides off of the lower edge of the dwell surface 78" and rapid return movement of the tool results as in the other embodiments.

In the operation of the machine, the quill is normally maintained in its upper or retracted position by the counter-weight so as to facilitate mounting of the work piece on the table. With the work piece in place, the operator rotates the hand wheel to roll the associated worm gear downwardly along the constantly rotating feed screw, such actuation serving to advance the tool rapidly toward the work at any desired speed. As the tool approaches the work, the brake lever moves into engagement with the control cam so as to apply the brake to the hand wheel and thereby disable the hand wheel as an actuator. This action takes place automatically so that no particular care is required on the part of the operator. The actuation or control of the quill, is by the automatic application of the brake, transferred to the constantly driven feed screw which acts on the nut formed by the fixed worm gear 54 to impart slow speed feeding movement to the quill.

Thus far the operation of all three embodiments of the invention is identical. In the form disclosed in Figs. 1 to 5, the feeding movement continues while the brake lever rides along the dwell surface of the cam member. As the lever rides off of the lower edge of the cam member, the brake is released, and the counter-weight retracts the quill at rapid traverse speed.

The embodiment shown in Figs. 7 and 8 provides for feeding movements of the tool in both directions, and the brake control cam is relatively long so as to prevent release of the brake at the lower end of the feeding stroke. The stroke, is, however, terminated by the upper dog carried by the quill, this dog serving to close the control switch of the solenoid actuator. The reversing clutch, being actuated from its normal forward-feeding position, then drives the feed screw at feed speed in a reverse direction so that the tool is retracted at feeding speed until the brake lever rides off of the upper edge of the control cam. The counterweight then retracts the quill at rapid traverse speed, and the clutch control switch is opened by the lower dog so as to condition the mechanism for the succeeding drilling operation.

In the embodiment of Figs. 9 and 10, two feeding strokes and an intermediate rapid traverse stroke may be attained in the advancing movement of the tool. The initial tool-advancing operations are the same as in the other embodiments, and the brake lever is arranged to ride on the dwell surface of the brake cam throughout both of the feed movements and the intermediate traverse movement. When the end of the first feeding movement is reached, the switch control cam on the quill closes the switch of the solenoid control circuit to cause engagement of the clutch with the upper or rapid traverse worm gear. This causes rapid advancing movement of the tool for the distance determined by the length of the dwell surface on the switch control cam. When the switch is released by its cam, it opens so as to permit the feed clutch to re-engage and cause completion of the downward movement of the tool at feeding speed. Termination of the second feed stroke is caused by the brake lever riding off of the brake cam, after which the counter-weight acts to retract the quill at rapid traverse speed.

I claim as my invention:

1. A vertical boring machine comprising, in combination, a relatively narrow column, a work table in front of said column, a stationary head on said column above said table, a quill mounted on said head for vertical reciprocation toward and away from said table and having a drill spindle rotatably mounted therein, means normally urging said quill upwardly to a retracted position, and means for advancing said quill toward the table comprising a constantly rotated vertically positioned screw fixed within said head against axial movement, a horizontal actuating shaft mounted on said quill and movable vertically therewith, a worm gear fixed on said shaft and engaging said screw, a hand wheel on said shaft at one side of said head for manually rotating said shaft to roll said worm gear along said screw and thereby actuate said quill at any desired speed as determined by the speed of rotation of the hand wheel, a brake mechanism carried by said quill and operable to stop rotation of said shaft and hold said worm gear stationary and in the relation of a nut to said screw, whereby said screw imparts slow speed feeding movement to said quill in a downward direction, and means carried by said head operable at a predetermined point in the downward movement of said quill to apply said brake and maintain the brake in its effective relation to cause a predetermined downward feeding movement of the quill at slow speed by said screw.

2. A vertical boring machine comprising, in combination, a relatively narrow column, a work table in front of said column, a stationary head on said column above said table, a quill mounted in said head for vertical reciprocation toward and away from said table and having a drill spindle rotatably mounted therein, a pulley rotatably mounted on said head and splined to said spindle, a drive motor mounted in said column, a pair of idler pulleys mounted above the column, a pulley on the shaft of said motor, an endless belt passing about said motor pulley, said idler pulleys and said spindle pulley to drive the spindle, means normally urging said quill upwardly to a retracted position, and means for advancing said quill toward the table comprising an axially stationary vertically positioned rotatable screw within said head, a drive shaft mounted in said head and geared to said screw for rotating the same, a belt connection whereby said drive shaft is rotated from one of said idler pulleys, a horizontal manual actuating shaft mounted in said quill and having a worm gear fixed thereon engaging said screw, a brake mechanism for stopping rotation of said manual actuating shaft, and means operable during a predetermined portion of the advancing movement of the quill to apply said brake.

3. A boring machine comprising, in combination, a column, a work table in front of said column, a head on said column overhanging said table, a quill longitudinally reciprocable in said head toward and away from said table and having a drill spindle mounted therein, means normally urging said quill upwardly to a retracted position, and means for advancing said quill toward the table comprising a constantly rotated vertically positioned screw mounted within said head against axial movement relative thereto, a horizontal actuating shaft rotatably mounted on said quill and movable vertically therewith, a worm gear fixed on said shaft and engaging said screw, means for manually rotating said shaft to roll said worm gear along said screw and thereby actuate said quill at traverse rate, a friction brake operable to stop rotation of said shaft and maintain said worm gear stationary and in the relation of a nut to said screw whereby said screw imparts slow speed feeding movement to said quill in a downward direction, a lever controlling said brake, and a cam directly engaged by said lever to apply and maintain said brake applied during predetermined movements of said support.

4. A machine tool comprising a frame member, a support member reciprocable thereon, a rotatable screw mounted on one of said members against relative axial movement and parallel to the path of reciprocation of said support member, means for constantly rotating said screw, a rotatable shaft mounted on the other of said members transversely of said screw, a worm gear fixed on said shaft and engaging said screw, said shaft being manually rotatable to effect a rapid traverse of said support member, a friction brake for holding said shaft against rotation, and dog controlled means operable automatically in timed relation to the movement of said support member to apply said brake and smoothly bring said shaft to a stop thereby to effect a feed of said support member.

5. A machine tool comprising a frame, a support reciprocably mounted thereon, an axially stationary screw rotatably mounted on said frame parallel to the path of reciprocation of said support, a manual actuating shaft mounted on said support transversely of said screw, a worm gear on said shaft engaging said screw, means for manually rotating said shaft to cause traverse movement of said support, a friction brake carried by said support for smoothly stopping rotation of said shaft thereby to effect feed of said support, said brake having a shiftable actuator, and a cam member on said frame for directly engaging and operating said actuator to apply said brake at a predetermined point in the movement of said support, said cam member having a dwell surface along which said actuator may ride to maintain said brake applied, and means for rotating said screw.

6. In a machine tool having a frame with a reciprocable support thereon, the combination of a rotatable screw mounted on said frame against relative axial movement and parallel to the path of reciprocation of said support, an actuating shaft carried by said support transversely of said screw and having a worm wheel mounted on said shaft and engaging said screw, a friction band brake for stopping said shaft including an actuating lever ineffective to apply said brake when pivoted in one direction from a normal position, and operable to apply said brake when pivoted in the other direction from said normal position, and a cam on said frame directly engageable by said lever when said support moves in one direction to shift said lever in its brake-applying direction.

7. A machine tool comprising, in combination, a frame, a support reciprocably mounted thereon, means normally urging said support to a retracted position at one end of its path of movement, a manual actuating shaft rotatably mounted on said support transversely of the path of movement of said support, a worm gear fixed on said shaft, an axially stationary screw rotatably mounted on said frame parallel to said path and engaging said worm gear, means for rotating said screw in opposite directions including a direction changer, a brake for preventing rotation of said shaft, cam means operable to apply said brake at a predetermined point in the movement of said support toward the other end of said path, and to maintain said brake in its effective position until said support has moved to said other end of said path and partially back to its retracted position, and means for actuating said direction changer as the support moves in opposite directions, the actuation in one direction being at one limit of the support movement.

8. A machine tool comprising, in combination, a frame member, a support member mounted for reciprocation thereon, a screw rotatably mounted on one of said members against relative axial movement and parallel to the path of reciprocation of said support member, means for rotating said screw in opposite directions including a reversing clutch, a rotatable shaft mounted on the other of said members transversely of said screw and having a worm gear thereon engaging said screw, manual means for rotating said shaft to obtain a traverse of said support, a brake for holding said shaft against rotation thereby to effect a feed of said support, dog controlled means operable automatically in timed relation to the movement of said support to apply said brake, means controlling said reversing clutch, and dogs actuating said clutch controlling means in predetermined timed relation to the movements of said support.

9. A drilling machine comprising a column having an overhanging head, a quill vertically reciprocable in said head, a spindle in said quill, means for rotating said spindle, a screw rotatably mounted in a vertical position in said column adjacent to said quill but restrained against relative axial movement, a manual actuating shaft carried by said quill transversely thereof and having a worm wheel thereon engaging said screw, a brake for stopping said manual actuating shaft, a pair of worm gears rotatably mounted in spaced axial positions on said screw and having clutch teeth on their adjacent sides, a clutch member splined to said screw intermediate said gears and selectively engageable therewith, a pair of worms engaging said worm gears and driven from said spindle actuating means to rotate said worm gears in the same direction at feed and rapid traverse speeds, a clutch actuator normally engaging said clutch with the gear driven at feed speed, means operable automatically during the terminal portion of the downward movement of said quill to apply said brake, and means operable automatically upon said clutch actuator at predetermined points in said terminal movement of the quill to cause said clutch to engage with the gear driven at traverse speed and then to re-engage with the gear driven at feed speed.

10. A machine tool comprising, in combination, a frame member, a support member mounted thereon for reciprocatory movement, a screw mounted against relative axial movement on one of said members parallel to the path of movement of said support member, means for rotating said screw in one direction at feed speed or traverse speed including a shiftable feed-traverse clutch, a manually rotatable shaft mounted on the other of said members transversely of said screw and having a worm gear thereon engaging said screw, a brake for holding said shaft against rotation, brake controlling means, clutch shifting means, a first dog operable after a predetermined movement of said support to cause said brake controlling means to apply said brake, and a second dog operable while said brake is applied to cause the clutch shifting means to shift the clutch from feed to traverse position and back again.

11. A machine tool comprising a frame member, a support member reciprocable thereon, means urging said support to a retracted position, a screw rotatably mounted on one of said members against relative axial movement and parallel to the path of reciprocation of said support member, means for rotating said screw, a manually rotatable gear engaging said screw for rapid traverse actuation of said support member, a normally and inherently disengaged friction brake operable when engaged to hold said gear against rotation, means for applying said brake, and a dog engaged by said brake applying means and operable therethrough to apply said brake to obtain a predetermined feed motion, said brake releasing upon disengagement of said means with said dog to permit retraction of the support by the means urging the support to retracted position.

12. A machine tool comprising, in combination, a frame member, a support member mounted for reciprocation thereon, a screw rotatably mounted on one of said members against relative axial movement and parallel to the path of reciprocation of said support member, means for rotating said screw in opposite directions including a reversing clutch normally engaged to advance the support member, a manually rotatable shaft mounted on the other of said members and having a worm gear thereon engaging said screw, a brake for holding said shaft against rotation to actuate said support member at feed speed by rotation of said screw, means operable automatically in timed relation to the movement of said support member to shift said reversing clutch to retract said support, means operable automatically to apply and maintain said brake applied during a predetermined portion of the advancing and retracting movement of said support, and means for restoring said reversing clutch to normal position when said support is fully retracted.

13. A machine tool comprising in combination, a frame member, a support member reciprocably mounted thereon, means normally urging said support to a retracted position at one end of its path of movement, an elongated gear element axially fixedly mounted on one of said members parallel to the path of movement of said support member, a rotatable shaft mounted on the other of said members transversely of said elongated element and having a gear element operatively engaging said elongated element, manual means for rotating said shaft to reciprocate said support at traverse speed, power means for actuating said support through said gear elements at feed speed including a direction changer, dog actuated means operable after a predetermined manual advance of said support to render said power means effective until said support has moved to the end of its movement and partially back to its retracted position, a first dog for actuating said direction changer to arrest advance movement of said support and effect retracting movement at feed speed, and a second dog operable after said power means is rendered ineffective to return said direction changer to original position.

14. A machine tool comprising in combination, a frame member, a support member mounted for reciprocation thereon, a screw rotatably mounted on one of said members against relative axial movement and parallel to the path of reciprocation of said support member, means for rotating said screw in opposite directions including a reversing clutch, a rotatable shaft mounted on the other of said members transversely of said screw and having a worm gear thereon engaging said screw, manual means for rotating said shaft to obtain a traverse of said support, a brake for holding said shaft against rotation thereby to effect feed of said support in either direction dependent upon the direction of rotation of said screw, means operable automatically in the advancing movement of said support to apply said brake, and dog controlled means operable after a predetermined feed of said support in advancing direction and while said brake is applied to actuate said reversing clutch and thereby obtain a feed of the support in retracting direction.

15. A drilling machine comprising a head, a quill reciprocable in said head, a spindle in said quill, means for rotating said spindle, an axially fixed elongated gear element rotatably mounted adjacent said quill and parallel with the direction of reciprocation thereof, a manual actuating shaft carried by said quill transversely thereof and having a gear element engaging said elongated gear element, a brake for stopping said manual actuating shaft, a pair of gear wheels rotatably mounted in axially spaced positions on said elongated gear element and having clutch teeth on their adjacent sides, a clutch member splined to said gear element intermediate said gear wheels and selectively engageable therewith, complementary gear elements engaging said gear wheels and driven to rotate said wheels in the same direction at feed and traverse speeds, a clutch actuator normally engaging said clutch with the gear wheel driven at feed speed, means operable automatically during the terminal portion of the forward movement of said quill to apply said brake, and means operable automatically upon said clutch actuator at predetermined points in the terminal movement of the quill to cause said clutch to engage with the gear wheel driven at traverse speed and then to re-engage with the gear wheel driven at feed speed.

16. A machine tool comprising a frame member, a support member mounted thereon for reciprocatory movement, an elongated gear element axially fixedly mounted on one of said members parallel to the path of movement of said support member, a rotatable shaft mounted on the other of said members transversely of said elongated element having a gear element operatively engaging said elongated element, manual means for rotating said shaft to reciprocate said support member at any speed in either direction, power means for advancing said support member through said gear elements at feed speed or traverse speed including a shiftable feed traverse clutch normally urged to feed speed position, dog actuated means operable after a predetermined manual advance of said support to render said power means effective, clutch shifting means, and a dog operable while said power means is effective to cause said clutch shifting means to shift said clutch to traverse speed position for a predetermined length of time.

17. A machine tool comprising in combination, a frame member, a support member mounted thereon for reciprocatory movement, means urging said support to a retracted position, a screw mounted on one of said members against relative axial movement and parallel to the path of movement of said support member, means for rotating said screw in one direction at feed speed or traverse speed including a shiftable feed traverse clutch normally urged to feed speed position, a rotatable shaft mounted on the other of said members transversely of said screw and having a worm gear thereon engaging said screw, manual means for rotating said shaft to reciprocate said support member at any speed in either direction, a brake for holding said shaft against rotation to effect advancing movement of said support member by said screw, control means operating automatically after a predetermined advance movement of said support member to apply said brake to obtain movement of the support member by the screw and operating after a predetermined advance of said support member by the screw to release the brake and permit return of the support by the retracting means, and clutch actuating means operable automatically while said brake is applied to shift the clutch from feed speed position to traverse speed position and back again.

CLEMENT J. SCHROEDER.